United States Patent [19]
Johnson

[11] 4,084,609
[45] Apr. 18, 1978

[54] CARTRIDGE TYPE CHECK VALVE
[75] Inventor: Howard L. Johnson, Joliet, Ill.
[73] Assignee: Caterpillar Tractor Co., Peoria, Ill.
[21] Appl. No.: 724,145
[22] Filed: Sep. 17, 1976
[51] Int. Cl.² ............................................. F16K 43/00
[52] U.S. Cl. .................................... 137/327; 137/542;
137/543.13; 251/322; 251/323
[58] Field of Search ................... 137/327, 542, 543.13;
251/322, 323

[56] References Cited
U.S. PATENT DOCUMENTS

| | | | |
|---|---|---|---|
| 1,020,766 | 3/1912 | Lowe | 251/322 |
| 1,434,473 | 11/1922 | Arnold | 251/322 |
| 1,517,511 | 12/1924 | Howarth | 251/323 X |
| 1,973,227 | 9/1934 | Schoenrook | 251/322 X |
| 3,111,961 | 11/1963 | Dudgeon | 237/327 |

*Primary Examiner*—Harold W. Weakley
*Attorney, Agent, or Firm*—Phillips, Moore, Weissenberger, Lempio & Majestic

[57] ABSTRACT

A check valve comprises a housing defining a valve seat thereon and a valve member reciprocally mounted in the housing to normally engage the seat for blocking fluid flow therepast. Two pairs of split retaining members are mounted in axially spaced relationship on a stem of the valve member and are expanded axially thereon by a compression coil spring for biasing the valve member to its closed position. A stop member is secured on an end of the stem of the valve member to prevent movement of one pair of the retaining members therepast. A slot is formed axially through the stop member and extends partially in the stem of the valve member to expose an end of the spring.

11 Claims, 4 Drawing Figures

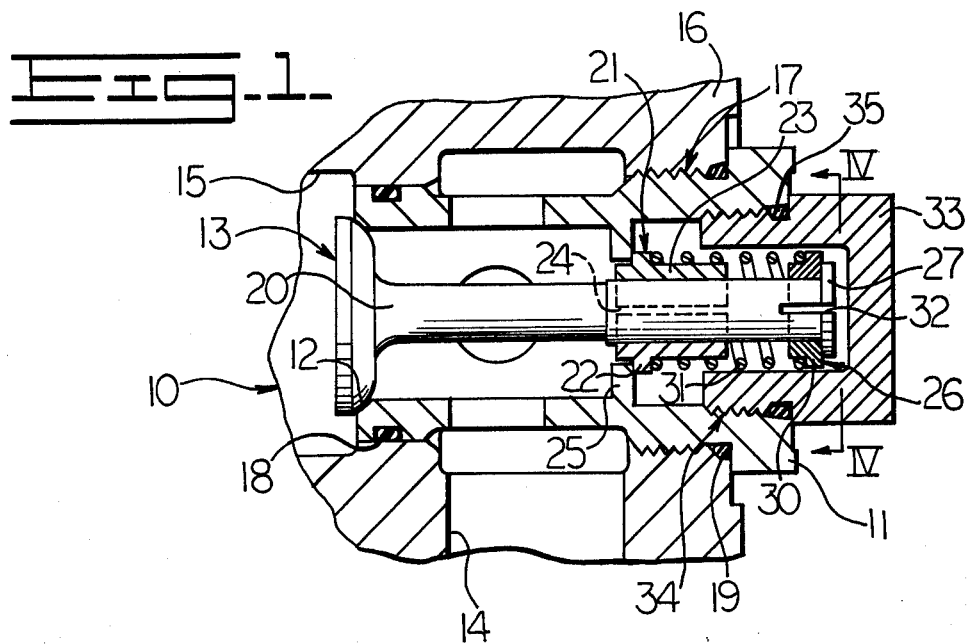
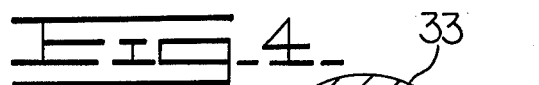
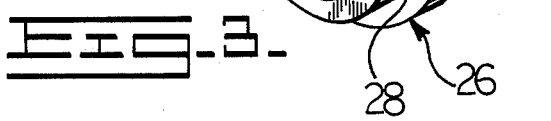
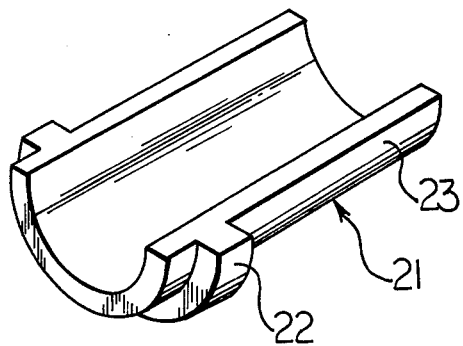

CARTRIDGE TYPE CHECK VALVE

BACKGROUND OF THE INVENTION

This invention relates to a check valve of the type having a spring-biased valve member reciprocally mounted therein to normally block fluid flow therepast and adapted to open when inlet pressures exceed a predetermined maximum level. Such a check valve is normally employed in a hydraulic circuit of the type used for controlling the extension and retraction of a hydraulic cylinder employed for selectively moving a work tool on heavy construction machines. Manufacturing and servicing costs dictate the desirability of a check valve which can be precalibrated and assembled and disassembled expeditiously for servicing or adjustment purposes. In addition, it is further desirable that the check valve exhibit a high degree of reliability and service life expectancy.

SUMMARY OF THIS INVENTION

An object of this invention is to provide an improved and non-complex check valve which provides the above-mentioned desiderata. The check valve comprises a housing defining a valve seat thereon and a valve member movably mounted in the housing to normally engage the seat for blocking fluid flow therepast. A spring means is mounted on the valve member to bias the valve member into its normal engagement with the seat. A semi-annular retaining means is disposed between a stop means on the valve member and the spring means and a slot means is formed through the stop means and in the valve member to expose an end of the spring means. The check valve is adapted to be pre-calibrated and attached on a main housing of an integrated valve assembly containing other valves therein.

BRIEF DESCRIPTION OF THE DRAWINGS

Other objects of this invention will become apparent from the following description and accompanying drawings wherein:

FIG. 1 is a longitudinal cross sectional view of a check valve embodying this invention;

FIG. 2 is an enlarged perspective view of a spring retaining member employed in the check valve;

FIG. 3 is an enlarged perspective view of another spring retaining member employed in the check valve; and FIG. 4 is a cross sectional view, taken in the direction of arrows IV—IV in FIG. 1, illustrating the disposition of a slot employed in the check valve to expose an end of the spring employed therein.

DETAILED DESCRIPTION

FIG. 1 illustrates a check valve 10 of the cartridge type comprising an annular housing or case 11 defining a semi-spherical seat 12 therein. A valve member 13 is reciprocally mounted in the housing to normally engage the seat in self-aligning relationship to block fluid flow from an inlet 14 to an outlet 15, both defined in a main housing 16. Housing 11 is threadably mounted in housing 16 at interengaging screw threads 17 to form an integral part thereof and O-ring seals 18 and 19 are mounted between housings 11 and 16 to prevent fluid leakage thereby.

Check valve 10 further comprises a stem 20 having a pair of semi-annular retaining members 21 mounted thereon. A stop means, preferably in the form of a radial flange 22, is formed circumferentially on each of the retaining members. As more clearly shown in FIG. 2, a main semi-cylindrical body portion 23 of each retaining member extends circumferentially less than 180° (e.g. 176°) to form a pair of diametrically opposed gaps 24 (one gap shown in FIG. 1). Flanges 22 abut an outboard side of a flange or stop member 25, formed internally on housing 11. Alternatively, retaining members 21 could be eliminated with spring 31 abutting flange 25 directly.

A second pair of semi-annular retaining members 26 are mounted on stem 20 and retained thereon by a stop means comprising an annular flange 27 formed on the end of the stem. As shown in FIG. 3, each retaining member 26 comprises a semi-cylindrical body portion 28 which also extends circumferentially approximately 176° to define a pair of diametrically opposed gaps 29 (FIG. 4). A radial flange 30 is formed on each retaining member 26 and a spring means 31, preferably a compression coil spring, is mounted between flanges 22 and 30 of axially spaced retaining members 21 and 26, respectively.

Referring to FIGS. 1 and 4, a slot means 32 is formed through flange 27 and to a limited depth in stem 20 of the valve member to expose an end of spring means 31. The slot means, as shown in FIG. 1, extends axially past retaining members 26 and is aligned radially with gaps 29, defined between the circumferential ends of the members. An annular cap 33 is threadably mounted on an end of housing 11 by interengaging screw threads 34 to fully cover and protect the check valve.

Upon assembly of the check valve in its cartridge form and assuming removal of cap 33 in FIG. 1, valve member 13 is initially inserted rightwardly in housing 11 to position it against seat 12. Retaining members 21 and spring 31 are then mounted on the stem of the valve member. It should be noted that the spring has an inside diameter slightly greater than the outside diameter of flange 27 to facilitate such mounting. A flat tool (not shown) is then inserted in slot means 32 to compress spring 31 against flanges 22 of retaining members 21.

Retaining members 26 are then mounted on the stem of the valve member, between flange 27 and spring 31. The tool is then removed from its engagement with the spring to release it whereby it expands over body portions 28 of retaining members 26 to abut flanges 30 thereof to urge the retaining members into engagement with flange 27. Cap 33 is then threadably mounted in place on housing 11 and another O-ring seal 35 may be disposed between the cap and housing to prevent the egress of fluid thereby.

The check valve is thus pre-calibrated and pre-set in cartridge form. The cartridge is then mounted on main housing 16 at screw threads 34 to become an integrated part of a fluid control circuit. Should the check valve require servicing, the above procedure may be substantially reversed with the tool being inserted in slot 32 to compress spring 31 to facilitate removal of retaining members 26 from valve member 13.

What is claimed is:

1. A valve comprising a housing defining a valve seat thereon, a valve member movably mounted in said housing and normally engaging said seat for blocking fluid flow therepast, stop means on said valve member, spring means mounted on said valve member for biasing said valve member into its normal engagement with said seat, semi-annular retaining means mounted on said valve member and disposed between said stop means and said spring means for retaining said spring means on said valve member, and slot means formed through said stop means and in said valve member to expose said spring means whereby insertion of a tool in said slot means will compress said spring means to facilitate installation or removal of said retaining means.

2. The valve of claim 1 further comprising a main housing defining an inlet and an outlet therein and wherein said first-mentioned housing is detachably mounted on said main housing.

3. The valve of claim 2 wherein said valve member is reciprocally mounted in said first-mentioned housing to constitute a check valve adapted to open when the level of fluid pressure in said inlet exceeds a predetermined maximum.

4. The valve of claim 1 wherein said stop means comprises an annular flange formed integrally on said valve member.

5. The valve of claim 4 wherein said spring means comprises a compression coil spring having an inside diameter slightly greater than an outside diameter of said annular flange.

6. The valve of claim 1 wherein said retaining means comprise a pair of semi-annular retaining members each extending circumferentially less than 180° to form a pair of diametrically opposed gaps between said circumferential edges of said retaining members, said gaps aligned with said slot means.

7. The valve of claim 6 wherein said slot means extends axially in said valve member past the axial lengths of said retaining members and said slot means exposes an end of said spring means.

8. The valve of claim 6 further comprising another pair of semi-annular retaining members mounted on said valve member in axially spaced relationship relative to said first-mentioned pair of retaining members and wherein said spring means is mounted axially therebetween.

9. The valve of claim 8 wherein each of said retaining members each comprise a radial flange formed thereon and wherein one end of said spring means engages the radial flanges formed on said first-mentioned pair of retaining members and the other end of said spring means engages the radial flanges formed on said another pair of retaining members.

10. The valve of claim 9 further comprising an annular flange formed internally on said housing and disposed in abutting relationship with the radial flanges formed on said another pair of retaining members.

11. The valve of claim 1 further comprising a cap detachably mounted on an end of said housing in covering relationship relative to an end of said valve member having said stop means formed thereon.

* * * * *